(12) United States Patent
Endo

(10) Patent No.: US 6,763,422 B2
(45) Date of Patent: Jul. 13, 2004

(54) CACHE MEMORY CAPABLE OF REDUCING AREA OCCUPIED BY DATA MEMORY MACRO UNITS

(75) Inventor: Osamu Endo, Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/026,820

(22) Filed: Dec. 27, 2001

(65) Prior Publication Data
US 2002/0133664 A1 Sep. 19, 2002

(30) Foreign Application Priority Data
Mar. 15, 2001 (JP) .................................. 2001-073337

(51) Int. Cl.$^7$ .............................................. G06F 12/08
(52) U.S. Cl. ........................................ 711/3; 711/128
(58) Field of Search .................................... 711/3, 128

(56) References Cited

PUBLICATIONS

Microsoft Computer Dictionary, Copiright 2002, Microsoft Press, Fifth Edition, p. 550.*

* cited by examiner

Primary Examiner—Mano Padmanabhan
Assistant Examiner—Midys Inoa
(74) Attorney, Agent, or Firm—Rabin & Berdo, PC

(57) ABSTRACT

A cache memory is provided which is capable of reducing areas occupied by data memory macro units and preventing delays in data transmission caused by wirings, thus improving performance of the cache memory.

The cache memory is provided with four data memory macro units the number of which is equal to that of ways. Each of the data memory macro units can be accessed simultaneously. A different way number is made associated, for every word address having the same index address, with a data storing position in each of the data memory macro units and data having the same index address and same word address in each of the ways is stored for every data memory.

15 Claims, 10 Drawing Sheets

PRIOR ART

PRIOR ART

CACHE MEMORY CAPABLE OF REDUCING AREA OCCUPIED BY DATA MEMORY MACRO UNITS

BACKGROUND OF THE INVENTION

1. Field of the Invention

The present invention relates to a cache memory to be connected to an MPU (Micro Processing Unit) and more particularly to a data memory in the cache memory.

2. Description of the Related Art

In general, the cache memory is provided between an arithmetic unit such as the MPU and a memory system serving as a main memory and performs a function of bridging a gap in a processing speed that occurs between the arithmetic unit and the memory system. The cache memory has a tag memory used to store data on addresses of the memory system and a data memory used to temporarily store part of data contained in the memory system as cache data. In the data memory, as is well known, desired cache data is read in one cycle and a predetermined amount of data referenced by the memory system is written in another one cycle. By these operations, a waiting cycle time of the MPU is reduced, thereby achieving high-speed operations between the cache memory and the MPU.

FIG. 2 is a schematic block diagram showing configurations of a data memory in a conventional cache memory employing a set-associative method. In the example shown in FIG. 2, the data memory in the conventional cache memory employs a four-way set-associative method in which unitized data memory macro units 10–13, 20–23, 30–33 and 40–43 used to manage cache data are provided in four ways "0–3", respectively. In FIG. 2, configurations of the data memory macro units 20–23 mounted in the way 1, the data memory macro units 30–33 mounted in the way 2 and the data memory macro units 40–43 mounted in the way 3 are the same as the data memory macro units 10–13 mounted in the way "0". Write data D0–D3 are values obtained by selection of multiplexers 50–53 from word data stored in a line buffer 1 or from MPU write data, which are input, as appropriate, to the data memory macro units 10–43. One of read data which are outputted from each of the data memory macro units 10–43 and are selected by multiplexers 60–63 and a multiplexer 70 is outputted to the MPU.

In the data memory in the cache, the data memory macro unit described above is provided to every word in all the ways (in the example shown in FIG. 2, the number of the words is four) so that one final read data can be outputted in one cycle. Each of the data memory macro units 10 to 43 is configured so as to be simultaneously accessed. At the time of reading of data, one data can be simultaneously from each of the data memory macro units 10 to 43 by inputting an address fed from the MPU to an address terminal A of each of all the data memory macro units 10 to 43 and by inputting chip enable signals 0 to 3 [0:3] having been asserted to a chip enable input terminal CE of each of the data memory macro units 10 to 43. Here, "[0:3]" denotes the chip enable signals [0] to [3]. In the data memory, one required data is finally selected from the data read from the data macro units 10 to 43, based on a word address contained in the addresses fed from the MPU and a way number, in which a cache hit has been found, fed from the tag memory. The final data selected as above is fed to the MPU.

Moreover, writing of data to each of the data memory macro units 10 to 43 is carried out when a request for writing is fed from the MPU or when a cache miss occurs due to absence of required data in the data memory. However, in the case of the occurrence of the cache miss, the above writing is carried out after the data read from the memory system have been stored in all the word data areas 0 to 3 in the line buffer 1 as shown in FIG. 2. When data are stored in all the word data areas in the line buffer 1, the writing of data is carried out to all the data memory macro units in any one of the ways 0 to 3. For example, when the writing of the data is performed in the way 0, in order to write all word data simultaneously in one cycle, then address fed from the MPU is input to the address input terminals A of each of the data memory macro units 10 to 13 and, at the same time, each of the write data D0 to D3 is input to the data input terminals D of each of the data memory macro units 10 to 13. Moreover, by inputting each of the chip enable signals 0 [0:3] having been asserted to each of chip enable input terminals CE of all the word data areas in the way 0 and by inputting each of write enable signals 0 [0:3] having been asserted to each of write enable input terminals WE of all the word data areas in the way 0, all the word data can be written simultaneously to the data memory macro units 10 to 13 in the way 0.

FIG. 3 is a diagram explaining a conventional format of an address fed from the MPU. In the cache memory, the address outputted from the MPU is used in a state where the address is divided into four portions including a tag data portion X1, index address portion X2, word address portion X3, and byte address portion X4. The tag data portion X1 is the data to be stored in the tag memory in the cache. The address of the data memory by which an access is required by the MPU is compared with effective data in the tag memory and, when both of them match each other, the cache hit occurs. The index address portion X2 is bit strings indicating a predetermined line position in each of the ways in the cache memory. The word address portion X3 is bit strings indicating a predetermined word position in a predetermined line. The byte address portion X4 is bit strings indicating a predetermined byte position in a predetermined word.

FIG. 4 is a diagram explaining a conventional data storing position in each of the data memory macro units 10–43 contained in each of the ways 0 to 3. For example, each of the data memory macro units 10 to 13 stores data corresponding the data 0 to 3 in the word address portion X3 as shown in FIG. 3. As each of physical memory addresses of the data memory macro units 10–13 in the way 0, that is, each of the cache memory address, the same number as used in the index address portion X2 is employed. Similarly, as each of physical memory addresses of the data memory macro units 20 to 43 in the ways 1 to 3, the same number as used in the index address portion X2 is employed. Examples of the data storing positions at the time of reading and writing are shown by shaded areas in FIG. 4. At the time of reading, if the address requested for reading by the MPU is, for example, "0" for the index address and "2" for the word address, data of (x, 0, z) (x 0 to 3, z 0 to 3) containing data (x, 0, 2) is read as candidate data, as shown in FIG. 4. Out of these candidate data, one data for each of the ways 0 to 3 is selected and, further, out of the data selected for each of the ways 0 to 3, final read data is selected and read. Moreover, at the time of writing, if the index address of the read miss address caused by the cache miss is "511" and if the way to be written is "0", data stored in the line buffer 1 is written to a place corresponding to the positions (0, 511, z) as shown in FIG. 4.

FIG. 5 is a diagram explaining an example of a conventional floor plan for an LSI (Large Scale Integrated Circuit)

having a cache memory. In FIG. 5, a TAG memory section 81 of the cache memory, an MPU 82, a control section 83, and a data memory section 84 of the cache memory are shown. A size of a die 80 indicates outer dimensions of the LSI chip. In the example of FIG. 5, the data memory section 84 has 16 pieces of data memory macro units 85. Each of the data memory macro units 85 is unitized, that is, is operating as a separate unit, which corresponds to each of the 16 pieces of the data memory macro units 10 to 13, 20 to 23, 30 to 33, and 40 to 43 shown in FIG. 2.

FIG. 6 is a time chart explaining operations of the conventional data memory macro units 10 to 43 at the time of reading and writing. Each of the data memory macro units 10 to 43 operates in synchronization with a predetermined clock. As shown in FIG. 6, at the time of reading, an address signal RA1 is input during an edge T2 of the clock and, at the same time, one of the chip enable signals 0 to 3 [0:3] having been asserted is input. Read data signal RD1 is output during an edge T3 of the clock so that the MPU can latch the data signal RD1. Moreover, at the time of writing (in the example, the writing is performed in the way 0), both an address signal WA2 and one of write data signals (0 to 3) WD are input during an edge T4 of the clock and, at the same time, the chip enable signal 0 [0:3] and the write enable signal 0 [0:3] each having been asserted are also input. This causes a value of the write data (0 to 3) WD2 to be written to each of the corresponding data memory macro units.

However, in the conventional configurations described above, the data memory macro units each being unitized in numbers that can correspond to the number expressed by "the number of ways x the number of words" (in the above example, 16 pieces) have to be prepared and each of them has to be connected to the MPU. As a result, as in the example of the floor plan shown in FIG. 5, some places exist where wirings between the MPU 82 and each of the data memory macro units 85 become long, which causes delays in data transmission between them and interferes with high-speed operations. As the number of the data memory macro units in the memory cache becomes large, an area of the LSI also increases, which causes an increase in a unit price of the LSIs.

SUMMARY OF THE INVENTION

In view of the above, it is an object of the present invention to provide a cache memory which is capable of reducing areas occupied by data memory macro units and preventing delays in data transmission caused by wirings mounted between an MPU and the data memory macro units, thus improving performance of the cache memory and inhibiting an increase in a unit price of LSIs.

According to a first aspect of the present invention, there is provided a cache memory for temporarily storing part of data stored in a main memory as cache data and having N pieces of ways being represented by two or more integers and employing a set associative method in which the cache data is managed for each of the ways, including:

a plurality of data memory macro units in which a storing position of each of the cache data is designated by a way number used to identify the way, an index number designated by part of an address to be fed to data stored in the main memory and a word number designated by other part of the address and each being able to be accessed simultaneously; and wherein each of the cache data being given the same way number and same index number is stored in the data memory macro units being different from each other and each of the cache data being given the same index number and same word number is stored in the data memory macro units being different from each other.

In the foregoing, a preferable mode is one wherein a physical cache memory address being commonly applied among the data memory macro units is given in each of data storing positions in each of the data memory macro units and wherein each of the cache data being given the same index number and same way number is stored in the cache memory address being different among the data memory macro units.

Also, a preferable mode is one wherein each of the data being given the same index number and same word number is stored in the cache memory address being same among the data memory macro units.

Also, a preferable mode is one wherein a physical cache memory address being commonly applied among the data memory macro units is given in each of data storing positions in each of the data memory macro units and wherein each of the data being given the same index number and same way number is stored in the cache memory address being same among the data memory macro units.

Also, a preferable mode is one wherein each of the data being given the same index number and same word number is stored in the cache memory address being different among the data memory macro units.

Also, a preferable mode is one wherein each of cache data being given the same index number out of the cache data stored in each of the data memory macro units is given the different way number and different word number.

Also, a preferable mode is one wherein a plurality of the cache data stored in each of the data memory macro units includes the index numbers being arranged continuously so that the index numbers are sequentially increased by a group of the cache data having the same index number in a manner so as to correspond to arrangement of the cache memory addresses and wherein each of the cache data making up each group of the cache data having the same index number includes the way number or the word number cyclically arranged.

Also, a preferable mode is one wherein a phase in an arrangement cycle of the way numbers or the word numbers included in the cache data making up each group of the cache data is different among the data memory macro units.

Also, a preferable mode is one wherein the number of the data memory macro units exceeds the number of the ways being N pieces.

Furthermore, a preferable mode is one wherein the number of the data memory macro units is a multiple of the number N.

With the above configurations, the number of the data memory macro units can be made smaller than that in the conventional case. This can present the wiring distance between each of the data memory macro units and the arithmetic device from becoming longer, thereby avoiding easy occurrence of delays in access to each of the data memory macro units. It is thought that, in order to reduce the number of the data memory macro units to give considerations to the wiring distance described above, the capacity per one data memory macro unit is increased to correspond to the decrease in the number of the data memory macro units and the specified way number is assigned to each of the data memory macro units. However, when each of the data memory macro units the capacity of which is increased is merely classified by the way number, there is a fear that data having the same index address may be stored in one data memory macro unit. Moreover, in the cache memory, in general, since simultaneous writing of each data to be stored in different cache memory addresses in one data memory macro unit connected to one port is difficult, each data cannot be written in one data memory macro unit in one cycle. However, in the cache memory of the present invention, the data storing position is assigned so as to solve the above problems, that is, as in the conventional cache, by using comparatively small number of the data memory macro units, the cache data can be read in one cycle and can be written in another cycle.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

Embodiment

Figure 1:
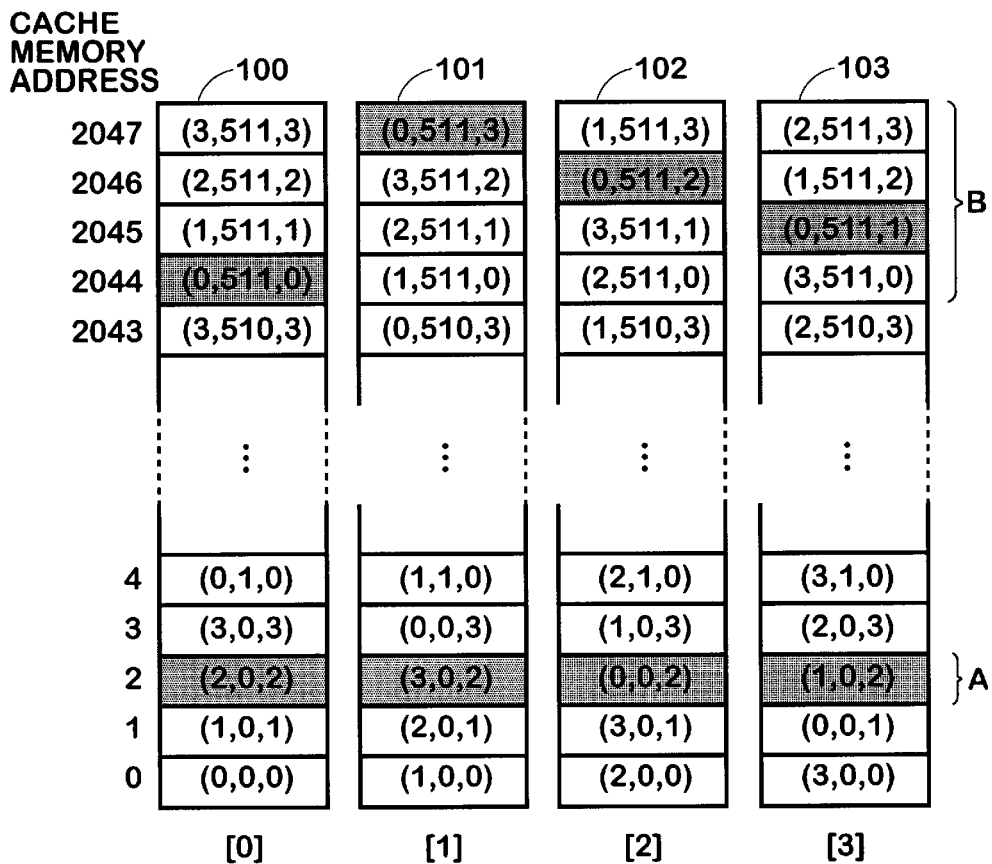
FIG. 1 is a diagram showing data storing positions in a cache memory according to an embodiment of the present invention.
Figure 2:
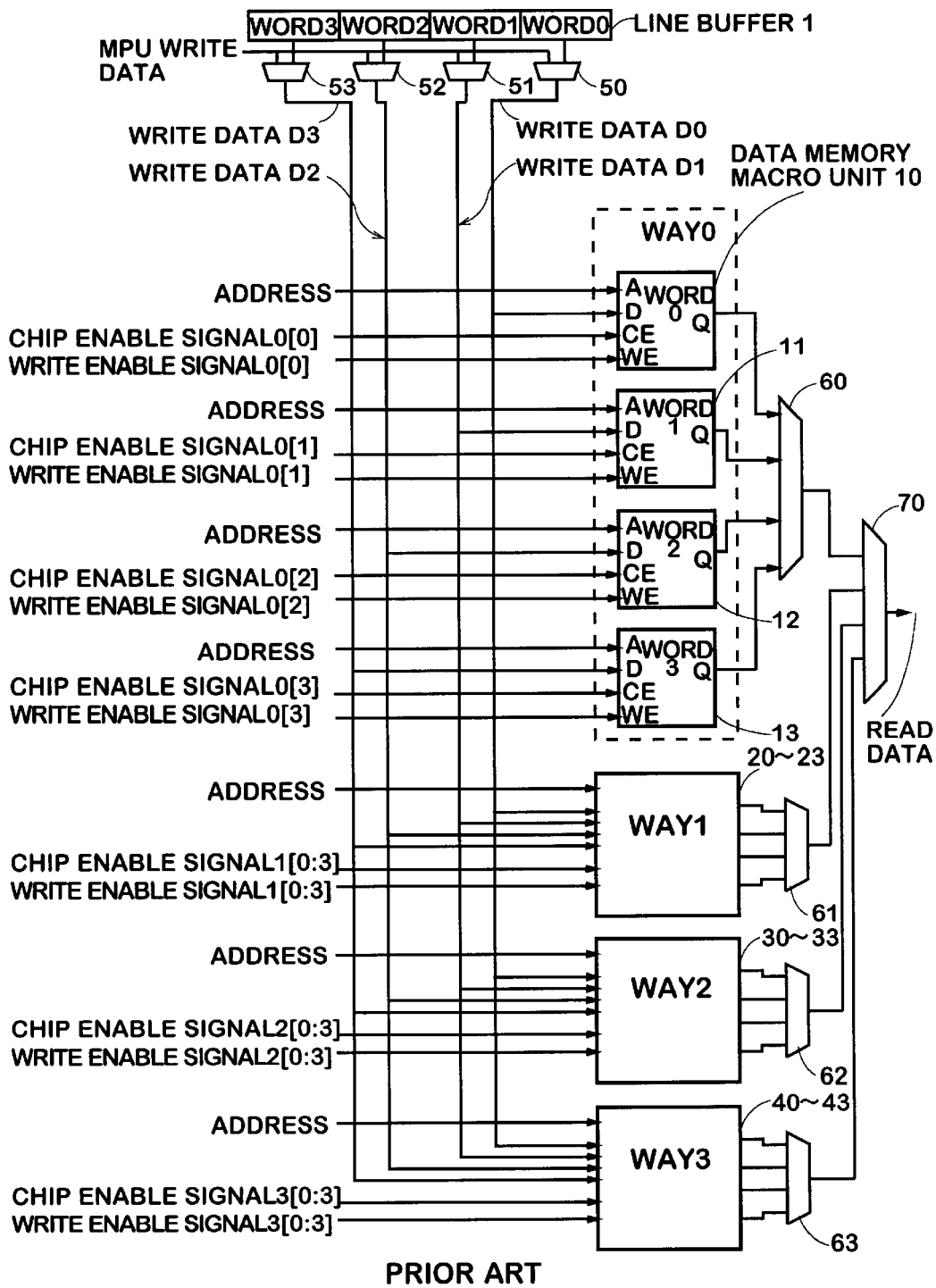
FIG. 2 is a schematic block diagram showing configurations of a data memory in a conventional cache memory employing a Set-Associative method.
Figure 3:
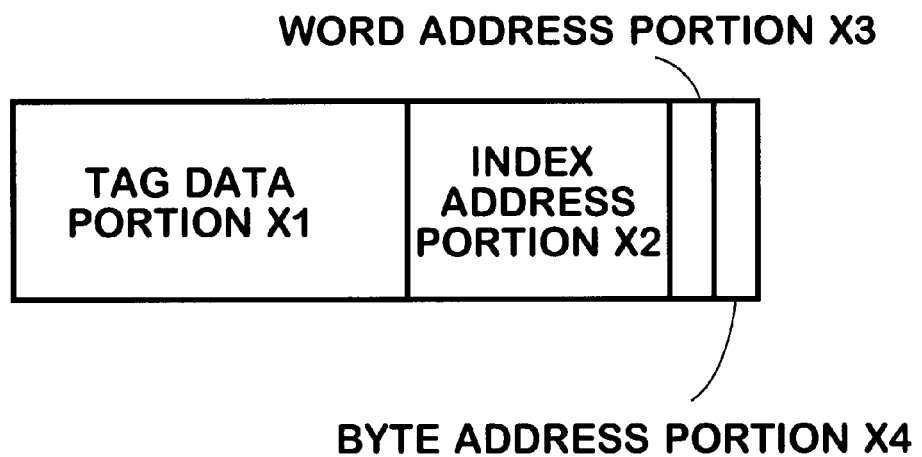
FIG. 3 is a diagram explaining a conventional format of an address data fed from an MPU.
Figure 8:
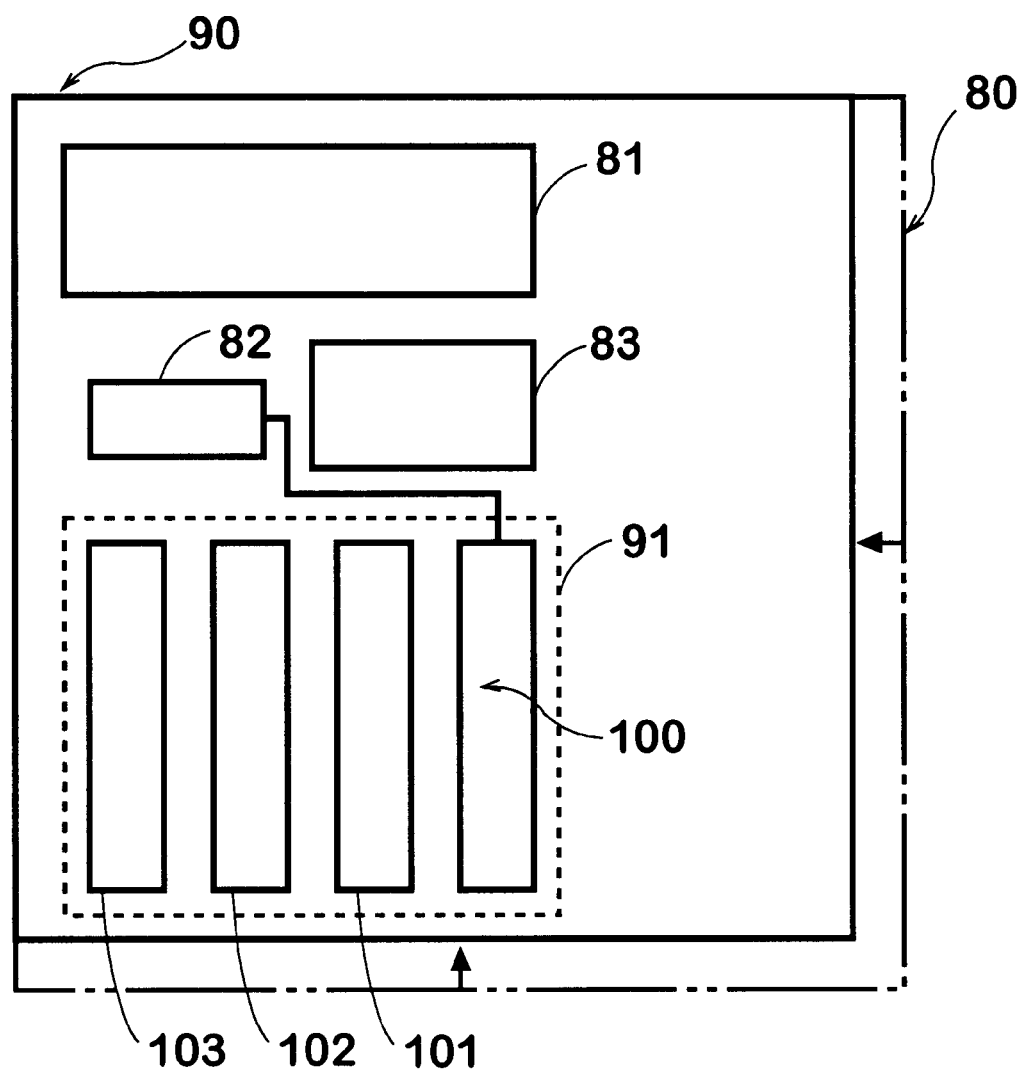
FIG. 8 is a diagram illustrating a floor plan for an LSI having the cache memory of the embodiment of the present invention.

FIG. 1 is a diagram showing data storing positions in a cache memory according to an embodiment of the present invention. Prior to descriptions of the embodiment of the present invention, configurations of the cache memory will be explained. FIG. 8 is a diagram illustrating a floor plan for an LSI having the cache memory of the embodiment of the present invention. The cache memory includes a TAG memory section 81 and a data memory section 91 shown in FIG. 8 and operates under the control of the control section 83. The cache memory functions as a buffer storage device for a memory system (not shown) serving as a main memory in accordance with access information fed from an MPU 82. The TAG memory section 81 stores information about addresses of the memory system. Part of the data of the memory system is buffered as cache data in the data memory section 91. Moreover, the cache memory of the embodiment of the present invention employs the set-associative method in which the cache data is managed for every way.

Figure 4:
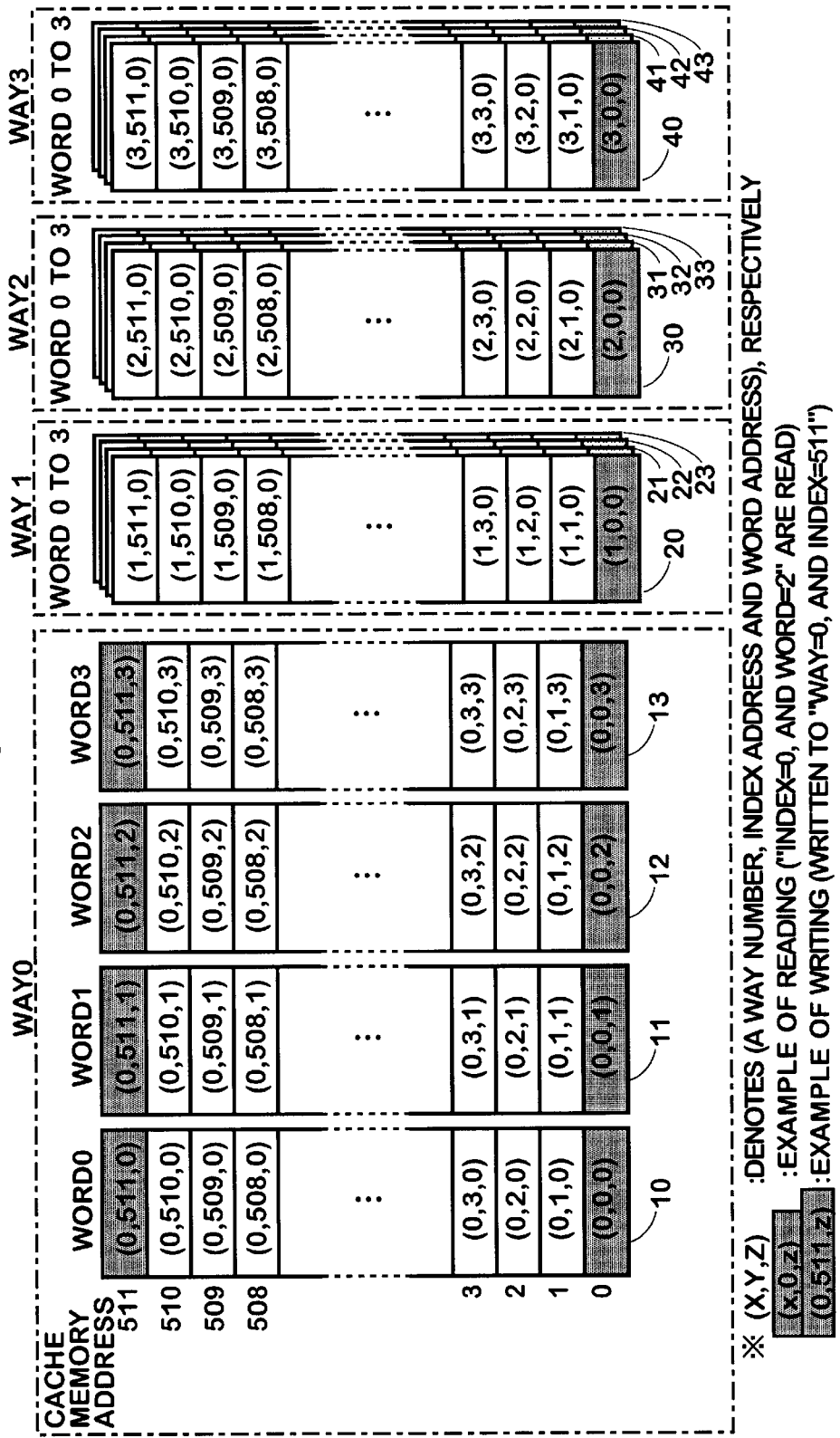
FIG. 4 is a diagram explaining a conventional data storing position in each of data memory macro units in ways.
Figure 5:
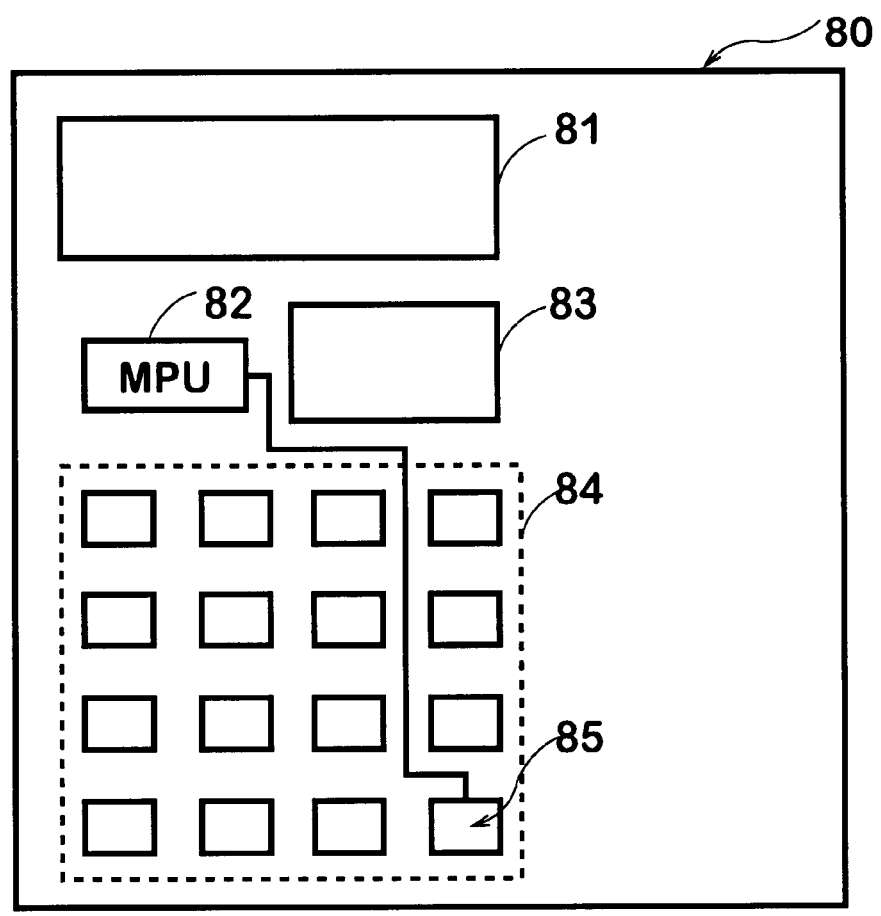
FIG. 5 is a diagram explaining an example of a conventional floor plan.
Figure 6:
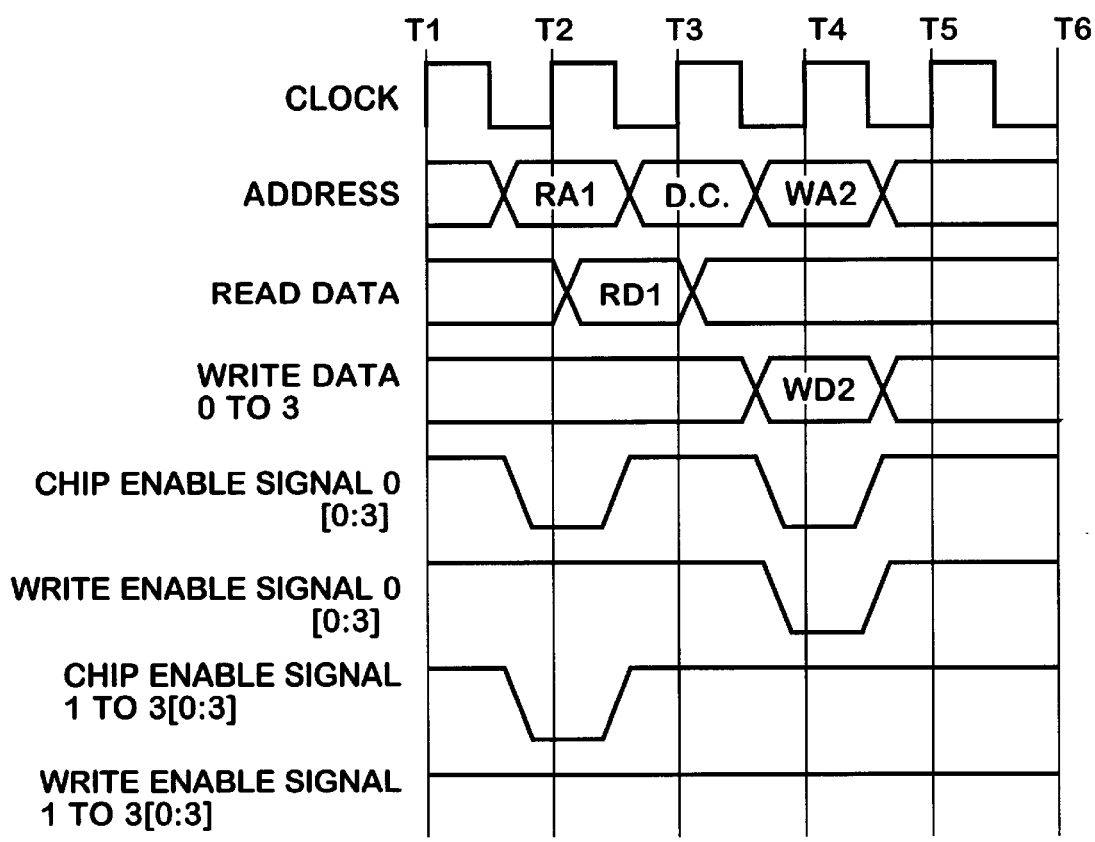
FIG. 6 is a time chart explaining operations of the conventional data memory macro unit at the time of reading and writing.
Figure 7:
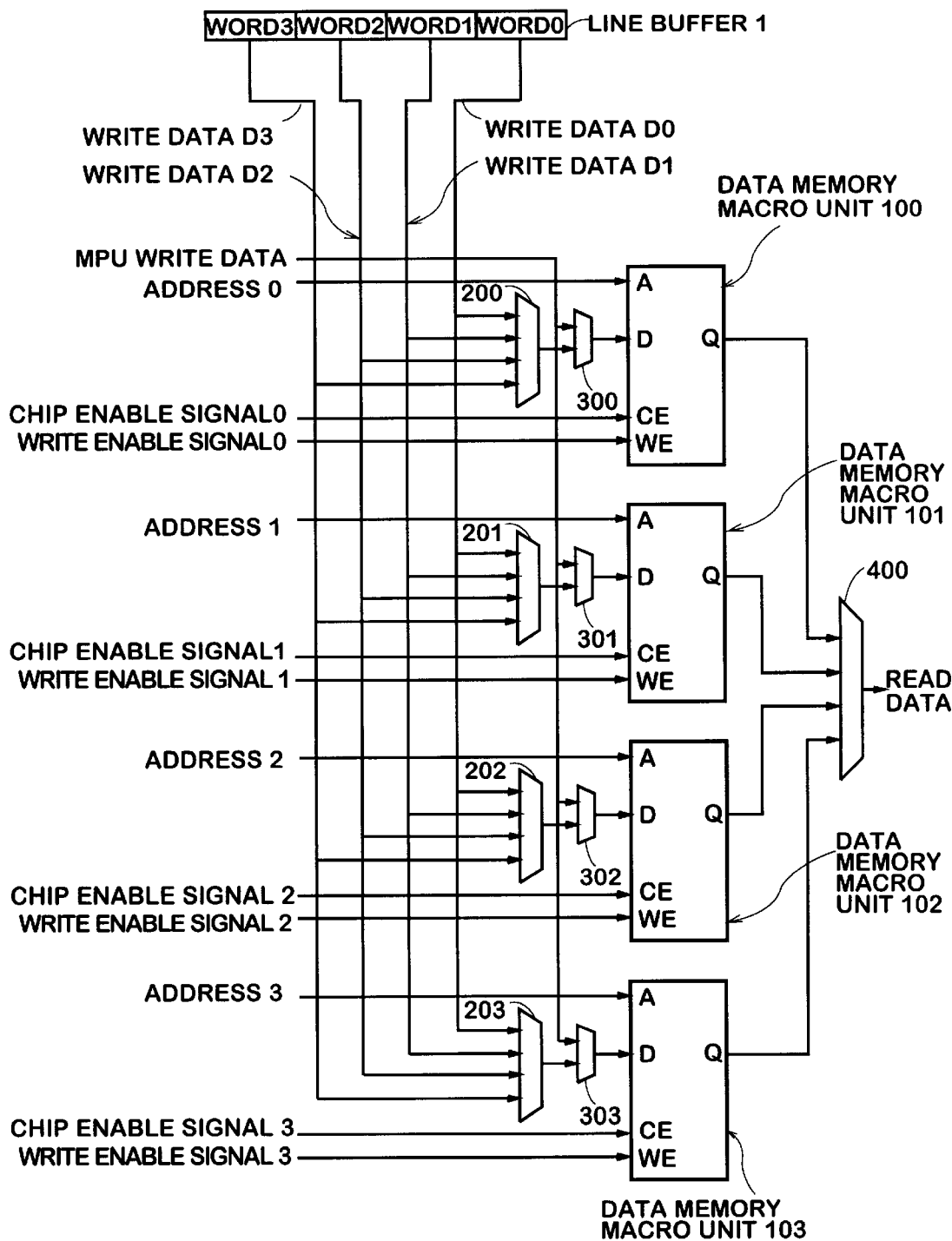
FIG. 7 is a diagram showing configurations of a data memory section of the cache memory of the embodiment of the present invention.

FIG. 7 is a diagram showing configurations of a data memory section 91 of the cache memory of the embodiment of the present invention. As shown in FIG. 7, the data memory section 91 includes a line buffer 1, data memory macro units 100 to 103, multiplexers 200 to 203, 300 to 303, and 400. The line buffer 1, as in the case of the conventional one, is the line buffer used to store a plurality of predetermined word data fed from the memory system and is configured so as to store 4 pieces of word data in the embodiment of the present invention. Each of the data memory macro units 100 to 103 is unitized and is a memory block that can be accessed simultaneously. The number of the data memory macro units, in the embodiment, is four which is equal to the number of ways used as data management units for the cache data, however, if necessary, the number of the data memory macro units can be increased so that it exceeds the number of the ways, for example, it may be a multiple of the number of ways. A capacity of each of the data memory macro units 100 to 103 is four times larger than the capacity of conventional one data memory macro unit (the number of words being four) shown in FIG. 4, however, the number of the data memory macro units is one-fourth smaller than that of the conventional data memory macro units and, therefore, a total capacity of all the data memory macro units remains unchanged. To an address input terminal A of each of the data memory macro units 100 to 103 is input one of address signals 0 to 3 making up part of addresses of the memory system to be fed from the MPU 82 and to a data input terminal D of each of the data memory macro units 100 to 103 is input one of outputs from the multiplexers 300 to 303. Moreover, to a chip enable input terminal CE of each of the data memory macro units 100 to 103 is input one of chip enable signals 0 to 3 and to a write enable input terminal WE of each of the data memory macro units 100 to 103 is input one of write enable signals 0 to 3. Each output Q from each of the data memory macro units 100 to 103 is inputted to the multiplexer 400. Details of data storing position in each of the data memory macro units 100 to 103 will be described by referring to FIG. 1 later.

The multiplexers 200 to 203 shown in FIG. 7 are used to select write data D0 to D3 for each of the word data which are outputted from the line buffer 1 and each of the selected outputs is input to each of the multiplexers 300 to 303. Each of the multiplexers 300 to 303 is used to select MPU write data and an output from corresponding multiplexers 200 to 203 and the selected output is input to a data input terminal D of each of the data memory macro units 100 to 103. The multiplexer 400, when having received the output Q from each of the data memory macro units 100 to 103, is used to send out an selected output corresponding to a way selection signal that the multiplexer 400 receives, as a final read data.

Next, the storing position of each of the data memory macro units 100 to 103 of the present invention will be explained by referring to FIG. 1. In the data storing position of each of the data memory macro units 100 to 103 are provided cache memory addresses each being commonly applied to each of the data memory macro units 100 to 103. In the example shown in FIG. 1, 2048 pieces of the cache memory addresses including "0 to 2047" are shown. In the data memory macro units 100 to 103 of the embodiment, when the index address is the same in each of the data memory macro units 100 to 103, different way numbers are provided for every word address. That is, in the example shown in FIG. 1, in the data for the cache memory address 2047, the index addresses for all the data memory macro units 100 to 103 are the same being 511 and different way numbers being 3, 0, 1, and 2 are provided for every word address being 3 for each of the data memory macro units 100 to 103. Moreover, data having the same index address and the same word address in each of the ways is stored in each of the data memory macro units 100 to 103. For example, in the cache memory address 0 of the data memory macro unit 100, data having a way number being 0, index address being 0 and word address being 0 is stored. Similarly, in the cache memory address 1 of the data memory macro unit 100, data having a way number being 1, index address being 0 and word address being 1 is stored. In the cache memory address 2 of the data memory macro unit 100, data having a way number being 2, index address being 0 and word address being 2 is stored. Thus, in the embodiment, data having a different word address are assigned to each of the data memory macro units 100 to 103 in a predetermined cycle of the word addresses and in a mixed manner. As described later, the cache memory address is constructed of an index address portion x2 and a word address portion x3 out of portions of addresses fed from the MPU so that they can correspond to the data storing positions. In the embodiment, since the index address can have 512 possible addresses (0 to 511) and the word address can have 4 possible addresses (0 to 3), by combining these addresses, the cache memory address can have 2048 possible addresses (0 to 2047).

Moreover, in each of the data memory macro units 100 to 103, the storing position of the data having the same index address and the same word address is assigned, for every way number, to the same cache memory address in the different data memory macro units 100 to 103. By configuring so, when a desired index address and a desired word address are designated by a request address fed from the MPU, single data for every way, that is, four cache data in total can read one by one simultaneously, from each of the data memory macro units 100 to 103. Such the data is used as a candidate for the final read data.

That is, in the data memory macro units 100 to 103, since data having the same index address and same word address are arranged in alignment on the line of the same cache memory addresses of each of the data memory macro units 100 to 103, when the data is read, the cache data of all the ways having a specified index address and specified word address can be read as selected candidates simultaneously in one reading cycle. Moreover, since data having the same way number and same index address is not placed in the same data memory macro unit, when the data is written, as described later, data on all the words having a specified index address and specified way number can be written by one writing cycle, which enables the number of the data memory macro units in the data memory section 91 to be minimized.

The cache memory address for each of the data memory macro units 100 to 103, which has been assigned in a manner as described above, can be obtained by the following equations. However, values handled in each of operational equations described below are binary numbers. As the cache memory address, values obtained by binding the index address and the word address together are used. For example, if the index address=0 and word address=2, the index address=$(0)_2$ in binary notation and the word address= $(10)_2$ in binary notation and, when these values are bound, the result becomes $(010)_2$. This value is used as the cache memory address designated when the data is read. In FIG. 1, for example, the value "2" is shown as the cache memory address which has been obtained by converting the $(010)_2$ into decimal numerals. Therefore, at the time of reading, when the request address is received from the MPU, the cache memory address corresponding to the request address is calculated by using the following equation.

Cache memory address designated at time of reading=binding of index address and word address out of request address from MPU  (Eq. 1)

The data corresponding to the required cache memory address out of the data contained in each of the data memory macro units 100 to 103 is read as a candidate for the read data.

The cache memory address designated at the time of writing can be obtained by the following equation.

Index portion=index address portion of address where cache miss has occurred  (Eq. 2)

Word portion=remainder of [(way number being wished to be written−data memory number+4)÷4]  (Eq. 3)

The data memory number used above represents a data memory macro identification number assigned to each of the data memory macro units 100 to 103. In the embodiment, "0" is assigned as the data memory number of the data memory macro unit 100. "1" is assigned as the data memory number of the data memory macro unit 101. "2" is assigned as the data memory number of the data memory macro unit 102. "3" is assigned as the data memory number of the data memory macro unit 103.

When the cache memory address at the time of writing is obtained, if, for example, one of the data on which writing is performed has the index address being 511, the word address being 3 and the data memory number being 1, each of the addresses and the data memory number are converted into binary numbers and the calculation using the above equations 2 and 3 is carried out. When two values obtained by the calculation are bound in the same manner as above, the result is $(11111111111)_2$. This is equivalent to "2047" in decimal numerals. Therefore, in the example shown in FIG. 1, the data is written in the storing position of the cache memory address "2047" in the data memory macro unit 101.

Moreover, the way number required for selecting the cache data using the multiplexer 400 at the time of reading or data selection signal used in the multiplexers 200 to 203 at the time of writing can be obtained by the following equations 4 and 5.

The way number of each data read as the candidate can be calculated from both of the word address and the identification number of each of the data memory macro units 100 to 103, that is, the data memory number by using the equation 4. Moreover, the data memory number corresponding to the way number of the final read data out of the required way number can be obtained by the control section 83 and the data memory selection signal required for selecting the required data memory number is fed from the control section 83 to the multiplexer 400.

Way number of data read from each of data memory macro units 100 to 103=remainder of [(word address+data memory number) 4]  (Eq. 4)

As the selection signal of data to be written, as is shown in the following equation, word number contained in the address of the write data is used and this word number is input to each of the multiplexers 200 to 203.

Word number of write data to each of data memory macro units 100 to 103=same as word portion of write address    (Eq. 5)

<Operations in Cache Memory>

In the cache memory configured as above, by the designation of the cache memory address described above and by the data selecting operation at the time of reading and writing, desired one data out of data in all ways can be read in one cycle and all the word data can be written to a desired one way in another one cycle.

At the time of reading, if the address requested for reading by the MPU is, for example, 0 for the index address and 2 for the word address, cache data that can satisfy these conditions (2, 0, 2), (3, 0, 2), (0, 0, 2) and (1, 0, 2) out of the cache data stored in each of the data memory macro units 100 to 103, are read (shown in a shaded area "A" in FIG. 1). At this point, the aligning order of the way corresponding to each of the data memory macro units 100 to 103 is "2, 3, 0 and 1".

Therefore, as described above, since data having the same index address and same word address are arranged in alignment on a line of the same cache memory address of each of the data memory macro units 100 to 103, when the data is read, the cache data in all the ways having a specified index address and specified word address can be read as selected candidates simultaneously in one reading cycle.

Moreover, at the time of writing, if a read miss address, that is, an address of data to be written is, for example, 511 for the index address and 0 for the writing way, each of the write data 0 to 3 stored in the line buffer 1 is written in positions (0, 511, 0), (0, 511, 3), (0, 511, 2) and (0, 511, 1) (shown in a shaded area "B" in FIG. 1) in each of the data memory macro units 100 to 103. At this point, the aligning order of each of the word addresses corresponding to each of the data memory macro units 100 to 103 is "0, 3, 2 and 1".

Therefore, as described above, since data having the same way number and same index address is not placed in the same data memory macro unit, when the data is written, data on all the words having a specified index address and specified way number can be written by one writing cycle. Though a total capacity of the data memory macro units 10 to 43 in the conventional data memory section 84 is equal to that of the data memory macro units 100 to 103 of the embodiment, the number of the conventional data memory macro units 10 to 43 is 16 pieces being four times larger than that of the data memory macro units 100 to 103 of the embodiment. Generally, a footprint is made smaller when a single data memory macro unit having a capacity being equal to a total capacity of a plurality of the data memory macro units is placed, compared with a case when the plurality of the data memory macro units are placed. This is because, by having the plurality of the data memory macro units merged into one data memory macro unit, components that can be commonly used such as signal wirings and wirings from the power source are increased. This enables the footprint to be made smaller in the data memory section 91 of the embodiment than in the conventional data memory section 84. As a result, it is possible to make smaller a size of a die 90 for the LSI of the embodiment compared with the size of the die 80 in the conventional LSI.

Figure 9:
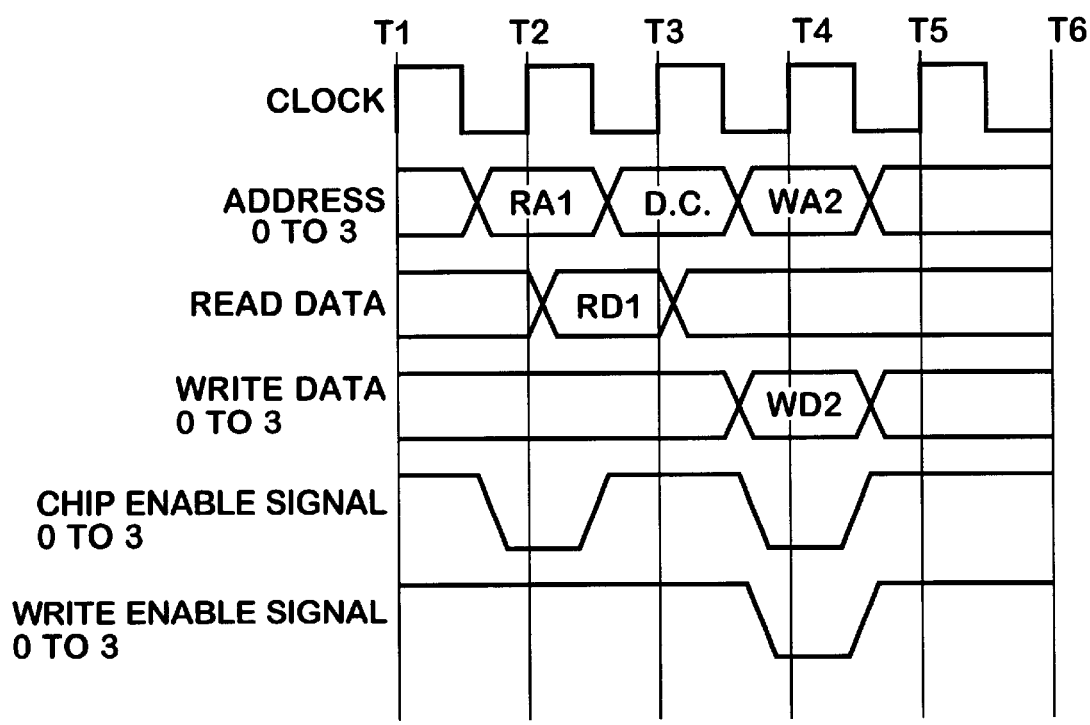
FIG. 9 is a time chart explaining operations at a time of reading or writing employed in the embodiment of the present invention.

FIG. 9 is a time chart explaining operations at the time of reading or writing employed in the embodiment of the present invention. Each of the data memory macro units 100 to 103 operates in synchronization with a predetermined clock, as in the case of the conventional data memory macro unit. At the time of reading, during an edge T2 of the clock, the address signals 0 to 3 are inputted and, at the same time, chip enable signals 0 to 3 having been asserted are inputted. At this point, each of the address signals 0 to 3 can indicate the same address. An effective read data is outputted with timing when the read data can be sampled during an edge T3 of the clock. At this time, data in each of the ways designated the address is outputted from each of the data memory macro units 100 to 103.

At the time of writing, the address signals 0 to 3 and write data signals 0 to 3 are inputted during an edge T4 of the clock. At this point, the index address provided by each of the address signals 0 to 3 is the same. As the word address, a value determined by the way number required to be written is supplied. Moreover, one write data corresponding to the word address is selected out of the write data 0 to 3 and the selected data is used as write data for each of the data memory macro units 100 to 103. At the same time, with the same timing, the chip enable signals 0 to 3 and write enable signals 0 to 3 are asserted. This enables data to be written simultaneously to each of the data memory macro units 100 to 103.

As described above, according to the embodiment of the present invention, since a different way number is made associated, for every word address having the same index address, with the data storing position in each of the data memory macro units and since data having the same index address and same word address in each of the ways is stored for every data memory macro unit, the number of the data memory macro units can be reduced from the conventional 16 to 4. As a result, as shown in FIG. 8, it is made possible to shorten the wirings, for example, between the MPU 81 and each of the data memory macro units 100 to 103. This enables reduction of a wiring delay and/or a delay caused by a repeater and improvement of performance of the cache memory. This also makes it possible to reduce an area of LSIs and to inhibit an increase in a unit price of LSIs.

Moreover, according to the above embodiment of the present invention, since, by designating one cache memory address, the candidate data on all the ways having specified word addresses can be read simultaneously in one reading cycle, high-speed performance required for implementing functions of the cache memory can be maintained.

Modified Embodiment

Figure 11:
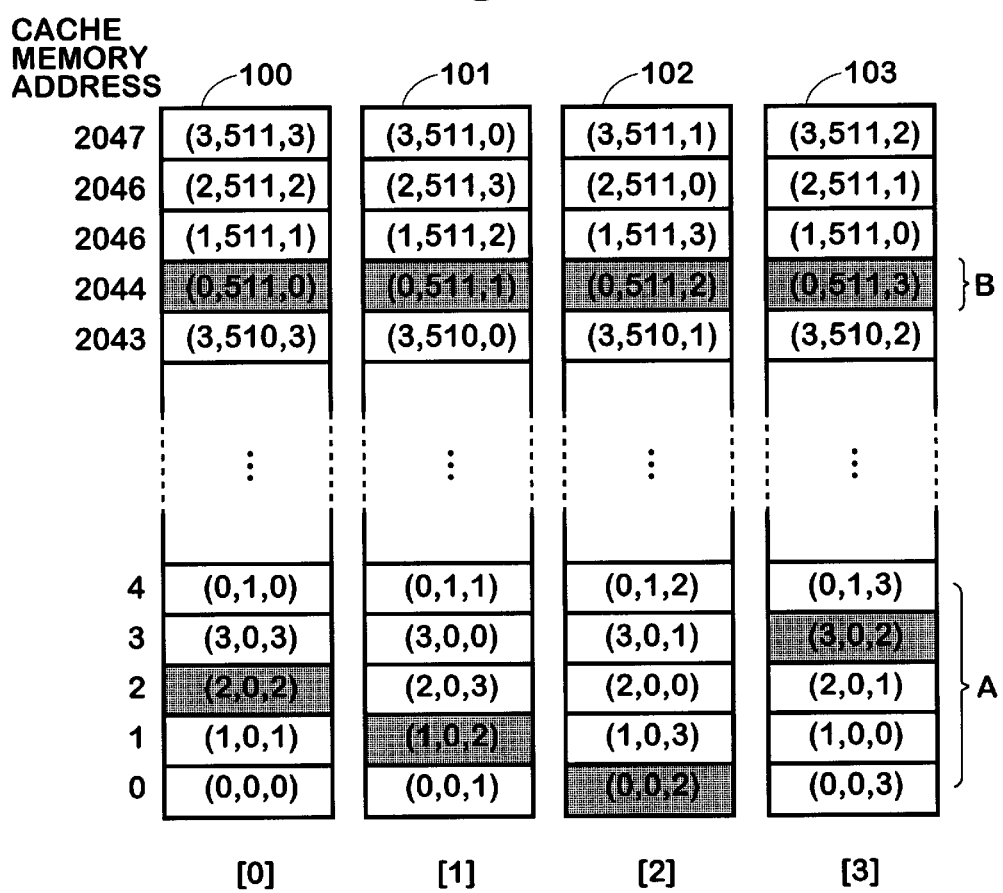
FIG. 11 is a diagram explaining a modified example of the data storing position according to the embodiment of the present invention.

FIG. 11 is a diagram explaining a modified example of the data storing position shown in FIG. 1. In the modified example, at the time of writing (indicated by a character B in FIG. 11), access can be given by using the same cache memory address of each of the data memory macro units 100 to 103. That is, in the above embodiment, at the time of writing, each data is stored in different cache memory address among the data memory macro units, however, in the modified example, the data storing positions in which the data should be written are arranged in alignment on one line. In this case, when the data is read from or written to the data memory macro units 100 to 103, the cache memory address can be obtained by the following equation.

The cache memory address to be designated at the time of reading can be obtained by:

Index portion=same as index address of MPU request address   (Eq. 6)

Word portion=remainder of [(word address of MPU request address−data memory number+4)÷4]    (Eq. 7)

The memory address at the time of writing can be obtained by:

Index portion=index address of address in which cache miss has occurred   (Eq. 8)

Word portion=way number    (Eq. 9)

Moreover, the reading or writing of the data to be selected by the multiplexer 400 at the time of reading or of the data to be selected by multiplexers 200 to 203 at the time of writing can be carried out in accordance with the following equations.

> Way number of data to be read from each of data memory macro units 100 to 103=remainder of (word address of MPU request address−data memory number+4)÷4] (Eq. 10)

> Word number of data to be written to each of data memory macro units 100 to 103=remainder of (way number 30 data memory number)÷4] (Eq. 11)

At the time of reading, if a read request address is, for example, 0 for the index address and 2 for the word address, the data existing in positions (2, 0, 2), (1, 0, 2), (0, 0, 2) and (3, 0, 2) (shown in a shaded area "A" in FIG. 11) in each of the data memory macro units 100 to 103 shown in FIG. 11 is read. At this point, the aligning order of each of the ways corresponding to each of the data memory macro units 100 to 103 is "2, 1, 0 and 3".

Moreover, at the time of writing, if a read miss address is, for example, 511 for the index address and 0 for the writing way, the data (write data 0 to 3) stored in the line buffer 1 is written in positions (0, 511, 0), (0, 511, 1), (0, 511, 2) and (0, 511, 3) (shown in a shaded area "B" in FIG. 11) in each of the data memory macro units 100 to 103. At this point, the aligning order of each of the word addresses corresponding to each of the data memory macro units 100 to 103 is "0, 1, 2 and 3".

It is thus apparent that the present invention is not limited to the above embodiments but may be changed and modified without departing from the scope and spirit of the invention. For example, in the above embodiment, in each of the data memory macro units 100 to 103, the word address used to designate a storing position for each data is assigned on an LSB (Least Significant Bit) side of the cache memory address, however, it may be assigned to other bits. Moreover, in the above embodiment, an example in which each of the data memory macro units is used inside the LSI is shown, however, the present invention is not limited to this, that is, it may be used, as an IC (Integrated Circuit) component of, for example, an SRAM (Static Random Access Memory), outside the LSIs, which enables reduction of the number of the ICs.

Also, in the above embodiment, the example in which the number of the ways is 4 and the number of the words is 4 is shown, however, other number of the ways and/or words may be employed. In this case, the number of the data memory macro units is preferably equal to that of the ways, as in the case of the above embodiment, however, the number of the data memory macro units may exceed the number of the ways. If the number of the ways is larger than that of the words, bit lengths being equivalent to 2 words or more are assigned to one data memory macro unit and same way number is made associated with the word address in each of the data storing positions. For example, when the number of the ways is 4, the number of the words is 8 and the number of the data memory macro units is 4, the bit lengths being equivalent to two words are assigned to one data memory macro unit.

Figure 10:
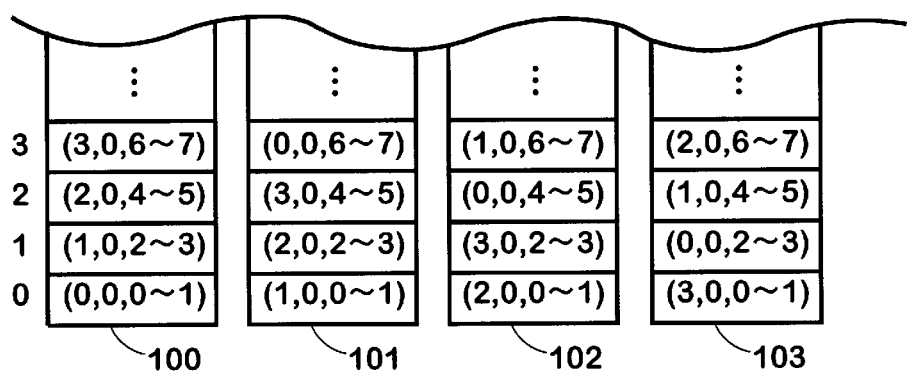
FIG. 10 is a diagram explaining data storing position in the case of the number of ways being 4 and the number of words being 8 according to the embodiment of the present invention.

FIG. 10 is a diagram explaining the data storing position in the case of the number of the ways being 4 and the number of the words being 8. As shown in FIG. 10, in each of the data memory macro units 100 to 103 having the same cache memory address, 2 words are assigned as the word address. This enables data in a unit of 2 words assigned to each way to be read at the time of reading and all the words (0 to 7) assigned to the way being the object of writing are written at the time of writing.

Moreover, in the above embodiment, the data storing position in each of the data memory macro units is configured as shown in FIG. 1, however, the present invention is not limited to this, that is, a different way number may be made associated, for every word address having the same index address, with the data storing position in each of the data memory macro units and data having the same index address and same word address in each of the ways may be stored for every data memory.

What is claimed is:

1. A cache memory for temporarily storing a part of data stored in a main memory as pieces of cache data, for access by an arithmetic unit, and employing an N-way set associative method in which said cache data is managed for each of said ways, said cache memory comprising:

a plurality of data memory macro units having a storing position for each of said pieces of cache data, each being designated by a way number used to identify one of said N ways, an index number determined by part of a corresponding address data at which said piece of data is stored in said main memory, and a word number determined by another part of said corresponding address in said main memory, said plurality of data memory macro units each being able to be accessed simultaneously; and a plurality of multiplexers, each connected to a data input terminal of one of said data memory macro units to allow simultaneous writing of N pieces of said cache data to said plurality of data memory macro units;

wherein pieces of said cache data designated by said same index number and different word numbers are stored together in each of said data memory macro units, and wherein pieces of said cache data designated by said same index number and different way numbers, are stored in different data memory macro units.

2. The cache memory according to claim 1, wherein a physical cache memory address, which is commonly applicable among said data memory macro units, is determined for each of said data storing positions in each of said data memory macro units, and wherein each of said pieces of cache data designated by said same index number and same way number is stored in a different cache memory address in each of said data memory macro units.

3. The cache memory according to claim 2, wherein each of said pieces of cache data designated by said same index number and same word number is stored in a same cache memory address in each of said data memory macro units.

4. The cache memory according to claim 2, wherein a plurality of said pieces of cache data stored in each of said data memory macro units are arranged in groups in which each piece of said cache data is designated by a same index number, said groups being arranged in order of sequentially increasing index number, in a manner so as to correspond to an arrangement of said cache memory addresses, and wherein each of said pieces of cache data comprising each said group is cyclically arranged in order of sequentially increasing way number.

5. The cache memory according to claim 4, wherein an initial way number in said cyclical sequence of said way numbers designating each of said pieces of cache data comprising said groups of said cache data is different among said data memory macro units.

6. The cache memory according to claim 1, wherein a physical cache memory address, which is commonly applicable among said data memory macro units, is determined for each of said data storing positions in each of said data memory macro units, and wherein each of said pieces of cache data designated by said same index number and same way number is stored in a same cache memory address in each of said data memory macro units.

7. The cache memory according to claim 6, wherein each of said pieces of cache data designated by said same index number and same word number is stored in a different cache memory address in each of said data memory macro units.

8. The cache memory according to claim 6, wherein a plurality of said pieces of cache data stored in each of said data memory macro units are arranged in groups in which each piece of said cache data is designated by a same index number, said groups being arranged in order of sequentially increasing index number, in a manner so as to correspond to arrangement of said cache memory addresses, and wherein each of said pieces of cache data comprising each said group is cyclically arranged in order of sequentially increasing word number.

9. The cache memory according to claim 8, wherein an initial way number in said cyclical sequence of said word numbers designating each of said pieces of cache data comprising said groups of said cache data is different among said data memory macro units.

10. The cache memory according to claim 1, wherein each of said pieces of cache data designated by said same index number comprising part of said cache data stored in each of said data memory macro units is designated by a different way number and a different word number.

11. The cache memory according to claim 1, wherein each of said pieces of cache memory comprises a number of words from said main memory which is a multiple of said number N.

12. The cache memory according to claim 1, wherein the number of said data memory macro units is a multiple of said number N.

13. The cache memory according to claim 1, further comprising:

a multiplexers connected to a data output terminal of each of said data memory macro units to allow simultaneous reading of N pieces of said cache data from said plurality of data memory macro units.

14. The cache memory according to claim 1, further comprising:

a line buffer connected to the plurality of multiplexers for receiving said N pieces of cache data from said main memory for writing to said plurality of data memory macro units.

15. The cache memory according to claim 1, wherein the number N is equal to four.

* * * * *